Dec. 30, 1969         A. KRAUSZ         3,487,229
DIGITAL REGULATION CONTROL SYSTEM FOR ELECTRICAL
POWER SOURCE ELEMENT ARRAY
Filed July 14, 1967                      2 Sheets-Sheet 1

Alfred Krausz
INVENTOR.

BY Daniel T. Anderson
ATTORNEY

Alfred Krausz
INVENTOR.

United States Patent Office
3,487,229
Patented Dec. 30, 1969

3,487,229
DIGITAL REGULATION CONTROL SYSTEM FOR ELECTRICAL POWER SOURCE ELEMENT ARRAY
Alfred Krausz, Pacific Palisades, Calif., assignor to TRW Inc., Redondo Beach, Calif., a corporation of Ohio
Filed July 14, 1967, Ser. No. 653,531
Int. Cl. H02j 7/00
U.S. Cl. 307—71                                                     2 Claims

ABSTRACT OF THE DISCLOSURE

The specification discloses an array of electrical power source elements such as photovoltaic cells and a voltage-current regulating network which achieves desired regulation thereof by digitally switching individual ones or sets of the cells electrically into or out of the power generating array. Reference is made to the complete specification for a description of the concepts and circuitry relating to the switching and control logic of the array system.

Background of the invention

This invention relates generally to an array of electrical power generating elements and more particularly to the combination therewith of improved voltage-current regulation circuitry.

Although the invention finds particularly advantageous application in the field of solar cell power generation and although, in the cause of clarity and brevity of presentation, much of the following discussion and description of examples of the invention relate particularly thereto, it is expressed to be understood that the advantages of the invention are equally well manifest in other fields wherein power generation is achieved in arrays or stacks or series of single elements such as, for example, thermoelectric or electrochemical cells, or the like.

With regard then to a solar cell power generator system consisting of a large array of many individual photovoltaic cells interconnected, typically, in a matrix of series and parallel subnetworks, a severe problem exists in providing any constant or otherwise predetermined parameters of electrical power output. The problem includes the conventionally recognized difficulties of regulating a complex power source and is aggravated by the inherently non-constant output characteristics of the individual power cells due to causes such as, for example, the degree of their eclipse by opaque structures, their angle of disposition toward the radiant photo energy source, their dependence upon temperature and upon effects of nonphoto radiations both as to the rate and accumulated dose thereof. The problem is further aggravated by the vast range of load and, therefore, regulation typically required for a solar cell power source.

Approaches toward solving this type of regulation problem in the past have typically been directed toward providing a single regulating network controlled by conventional electronic analog techniques utilizing complex and costly circuitry. Conventional regulators are connected in series with or in shunt across the power array. In either case, failure of the regulator causes failure of the entire power supply. Furthermore, the complex electronics require provisions for heat dissipation and necessitate greater overall weight due to the operating power requirement of the regulator and its cooling means. In addition, due to the lack of versatility in conventional power generating arrays and their regulators, DC to DC converters with their attendant power dissipation and cooling requirements are generally needed to provide the plurality of voltages and currents required from the array.

Redundancy techniques have been used in the past to provide greater reliability in the regulator and converter components; however, there are practical and economic limits to the magnitude of redundancy to be incorporated in the design of the solar power array. The cost of solar power, for example, is sometimes as high as $2,000 per watt of capability. Obviously reliability is important but must be optimized vis-a-vis costly redundancy. Such limitations on redundancy require that the individual generating element be designed to provide the highest possible reliability and selected from maximum quality and perfection, again increasing the expense of such arrays for practical systems. Furthermore, these same limitations and encumbent lack of versatility required that an array of power generating elements be custom engineered specifically for a given task, again increasing the expense of the system.

Accordingly, it is an object of the present invention to provide an electrical power source array system which is not subject to these and other disadvantages and limitations of the prior art.

It is another object of the present invention to provide such a system which is exceedingly versatile in its capability to supply a wide range and plurality of regulated voltages and currents without the requirement of separate DC to DC converters.

It is another object to provide such a system which is low in cost while being electrically and mechanically simple, rugged and reliable.

It is another object to provide such a system which is highly versatile even though the generator and control elements may be low cost, miniature standard components.

It is another object to provide such a system which is improved in its overall size and mass for a predetermined set of electrical requirements and specifications.

Very briefly, these and other objects are achieved in accordance with the structural concepts of an example of the invention which includes a plurality of electrical power generating elements electrically intercoupled to provide a predetermined electrical energy output. Each of the generating elements, which may include a plurality of subelements is provided with a digital, on-off control member which electrically switches the element into or out of the power generating circuit. The number of such elements switched into or out of the circuit may be determined by reference signals, feed back, and logic whereby the desired instantaneous electrical power output is provided.

Further details of these and other novel features and their principles of operation as well as additional objects and advantages of the invention will become apparent and be best understood from the consideration of the following description when taken in connection with the accompanying drawing which is presented by way of illustrative example only and in which.

Figure 1:
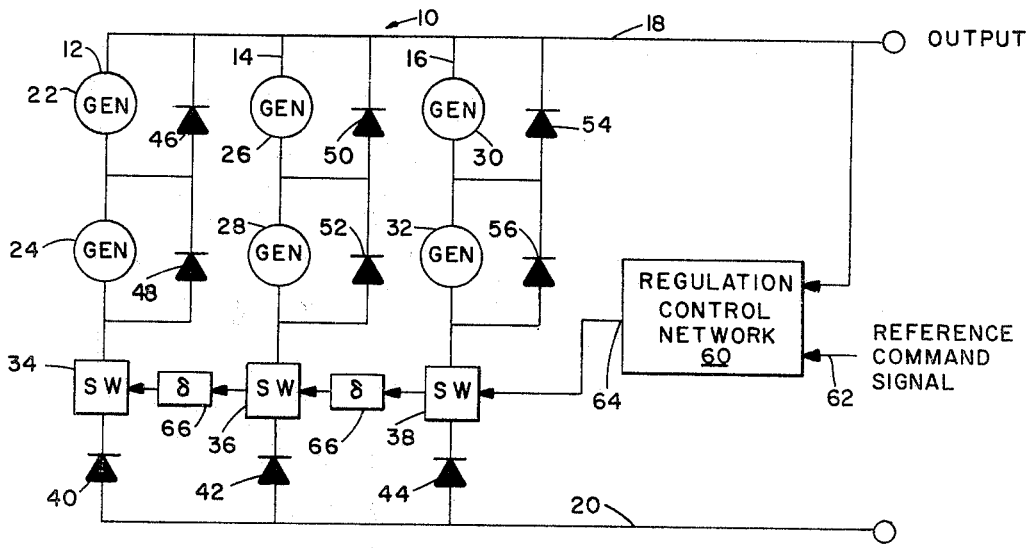
FIGURE 1 is a schematic diagram of an example of a digitally controlled electrical power generator array constructed in accordance with the principle of the present invention.

With specific reference now to the figures in detail it is stressed that the particulars shown are by way of example and for purposes of illustrative description only and are presented in the cause of providing what is believed to be the most useful and readily understood description of the principles and structural concepts of the invention. In this regard no attempt is made to show structural details of the apparatus in more detail than is necessary for a fundamental understanding of the invention. The description taken with the drawing will make it apparent to those skilled in the electrical arts how the several forms of the invention may be embodied in practice. Specifically the detailed showing is not to be taken as a limitation upon the scope of the invention which is defined by the appended claims forming, along with the drawing, a part of this specification.

Referring to FIGURE 1, a power source array 10 is illustrated as including a set of three series circuits 12, 14, 16 all connected in parallel between an output bus 18 and a common bus 20. The array 10 is representative of at least a portion of an example of a composite power source network which may include other similar portions interconnected with the illustrated array 10.

Each of the series circuits 12, 14, 16 includes, in this example, a pair of power cells 22, 24; 26, 28; and 30, 32, respectively. Also included in each of the series circuits is an electrically controlled switching element 34, 36, 38, respectively, and a protective unidirectional diode 40, 42, 44, respectively. In similar manner each of the source cells is bypassed by a unidirectional diode 46, 48, 50, 52, 54, 56, respectively; whereby, if its respective cell is effectively open circuited as, in the solar cell array case, by, for example, being eclipsed, the current generated by the remainder of the series may still contribute to the output power on the bus 18 by low impedence flow thru the bypass diode. Each of the diodes is, of course, normally biased in a non-conductive or high impedance state by the voltage generated by its associated cell.

The individual power source cells may, in a practical example, be silicon photoelectric diodes having large p-n junctions. The series switching elements 34, 36, 38 may be latching relays, saturating transistors, gate control rectifiers formed mechanically integrally with associated power source cell, or other types of fast acting switching devices such as simple forms of pulsed actuated bi-stable multivibrators or the like.

Referring further to FIGURE 1, a regulation-control network 60 is provided which monitors the voltage on the output bus 18, compares it with the reference or command signal impressed on the terminals 62, and generates a switching control signal at the output terminal 64 which is impressed, in this example, sequentially upon the control terminals of the switching elements 38, 36, 34. As many of the series circuits as desired are thusly switched into or out of the array to provide the required magnitude correlation between the reference or command signal and that on the output bus 18. To provide greater and, in some cases, a vernier type of control for the array 10, a signal delay means 66 exhibiting a delay of the order of a microsecond is shown interconnected between sequential ones of the switching elements; these preclude instantaneous switching of an excessive number of series circuits and minimize or effectively "damp" transient effects.

Figure 2:
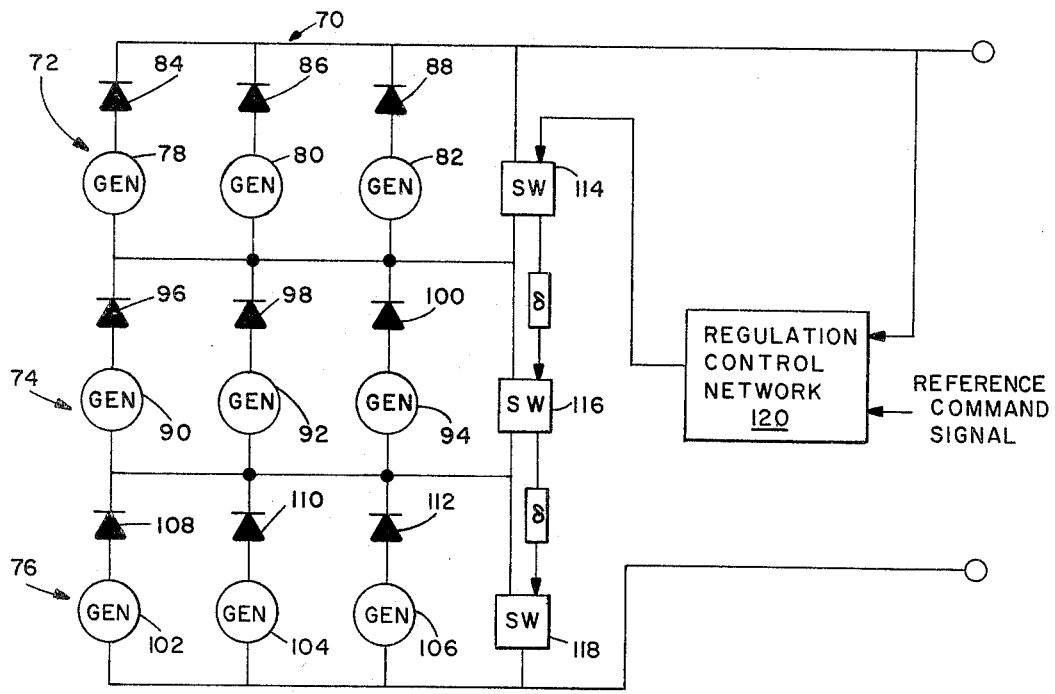
FIGURE 2 is a schematic view of an alternative example of the invention.

Referring to FIGURE 2, an example of the invention is illustrated in the form of an array 70 which includes three sets 72, 74, 76 of three power source cells connected in parallel and with the composite sets then connected in a series. The parallel set 72 includes source cells 78, 80, 82 and respective associated protective diodes 84, 86, 88; the set 74 includes source cells 90, 92, 94 and diodes 96, 98, 100; the set 76 includes source cells 102, 104, 106 and respective diodes 108, 110, 112. Each set further includes a parallel connected, electrically controlled switching element 114, 116, 118 which in its "closed" state shorts, or switches out, the power contribution of its respective set from the array 70. Again, the switching elements are actuated by appropriate control signals impressed thereon from the regulation-control network 120; and microsecond delay means may be interposed between sequential ones of the switching element along the control signal lead of the regulator network 120.

Figure 3:
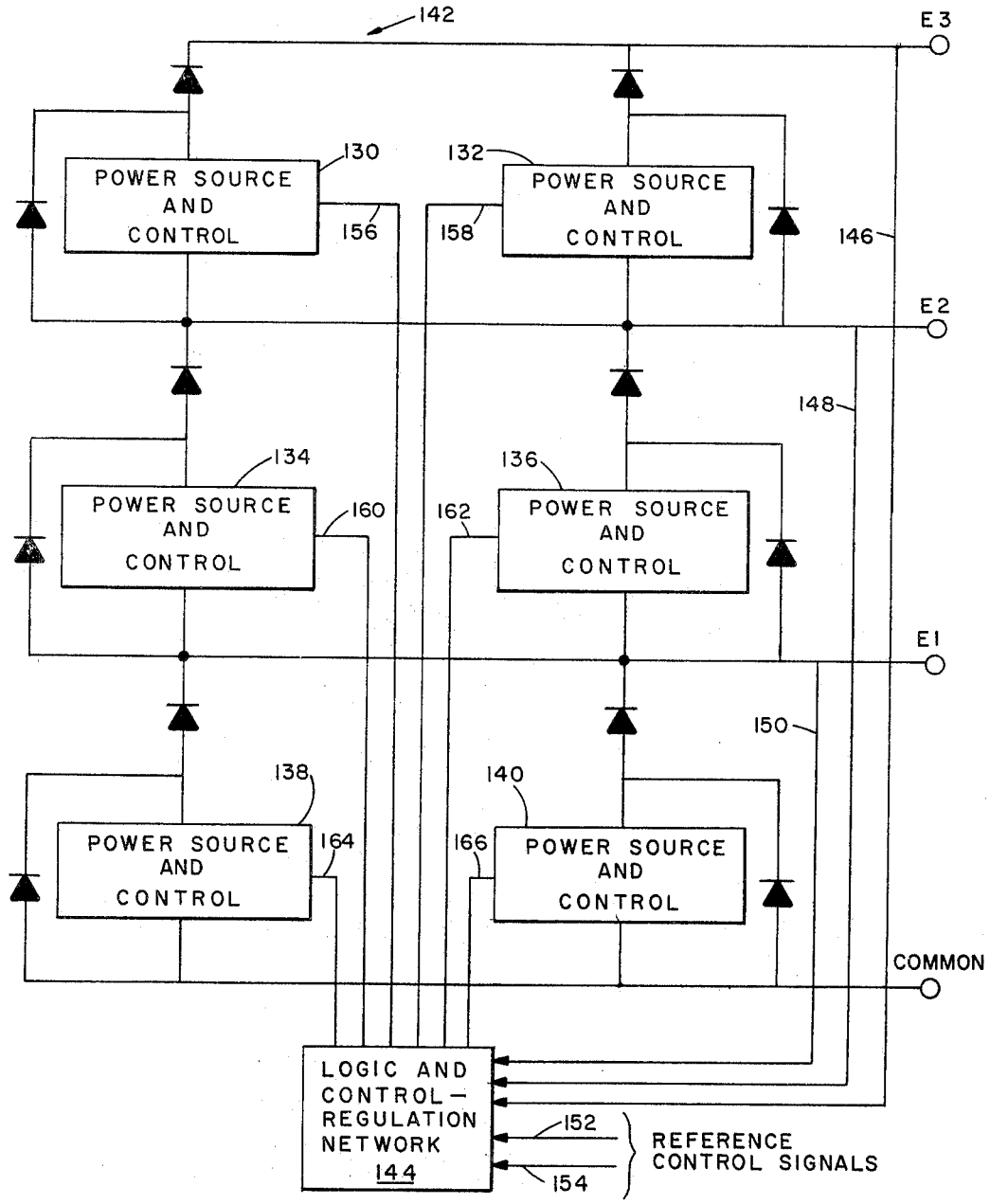
FIGURE 3 is a schematic diagram of a more generalized example of the invention presented for purposes of illustrating versatility and other aspects thereof.

Referring to FIGURE 3, a somewhat more general, matrix form example of the invention is illustrated which comprises a network of power sources and control components 130, 132, 134, 136, 138, 140 interconnected in a matrix array 142. In the example shown, the source components 130 and 132 are connected in parallel between the $E_3$ and $E_2$ buses, each component being bypassed and series connected with appropriate protective diodes as discussed in connection with the description of the previous figures. It should further be noted that each of the source components may be a single cell and switch element pair or may be a more complex sub-network as shown in either of the earlier figures. In the latter case the diodes shown in FIGURE 3, may of course, be needlessly redundant and therefore dispensable.

Similarly, the power source and control components 134, 136 are connected between the buses $E_2$ and $E_1$ while the components 138, 140 are connected between the busses $E_1$ and "common." In this manner by appropriate logic and regulation control provided at the logic and control-regulation network 144, the various source components may be controlled to provide a desired voltage or current magnitude at the respective output but terminals $E_1$, $E_2$, $E_3$. Information input signals to a logic network 144 may be provided by feedback leads 146, 148, 150 from the respective output buses $E_3$, $E_2$, $E_1$ and from reference and command signals impressed upon the terminals 152, 154 of the logic network 144.

Output control signals generated by the network 144 are transmitted along the leads 156, 158, 160, 162, 164, 166, to the respective ones of the power source components 130, 132, 134, 136, 138, 140, for switching the associated source components into or out of the regulated power generating array 142.

There has thus been disclosed and described a number of examples of a digital regulation control system for an electrical power source element array which achieve the objects and exhibit the advantages set forth hereinabove.

What is claimed is:

1. A solar cell power generator apparatus responsive to predetermined reference and control signals comprising:

photovoltaic cells intercoupled to define an array for supply of electrical energy of predetermined voltage and current parameters, said array having sets of series connected photovoltaic cells arranged in parallel;

unidirectional current bypass means connected in shunt with each photovoltaic cell;

remotely operable, on-off means connected to each of the sets of photovoltaic cells of the array in response to predetermined control signals; and network control means coupled to each of the off control means and being of the character to generate the predetermined control signals responsive to predetermine reference signals and to impress selectively the predetermined control signals upon the on-off control means.

2. The invention according to claim 1 in which the on-off control means is connected in series with its associated set of photovoltaic cells.

References Cited

UNITED STATES PATENTS 2,033,070    3/1936    Hanley   —————— 307—71 X

ROBERT K. SCHAEFER, Primary Examiner

H. J. HOHAUSER, Assistant Examiner

U.S. Cl. X.R.

250—206; 307—130; 320—7